June 25, 1935.  R. W. ALLEN  2,006,307
TIRE BUILDING APPARATUS
Filed Dec. 5, 1933  5 Sheets-Sheet 2
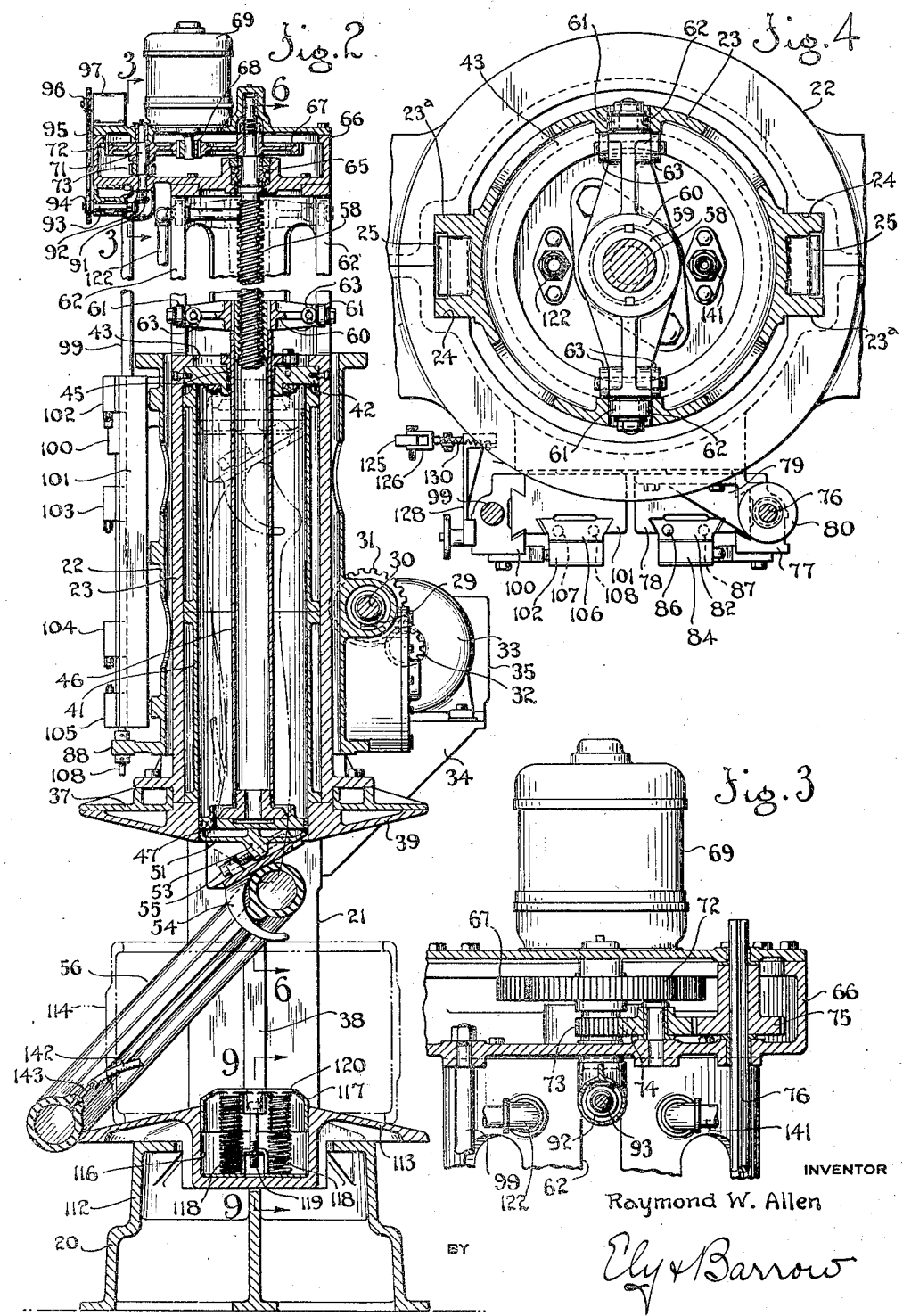
INVENTOR
Raymond W. Allen
BY Ely & Barrow
ATTORNEYS

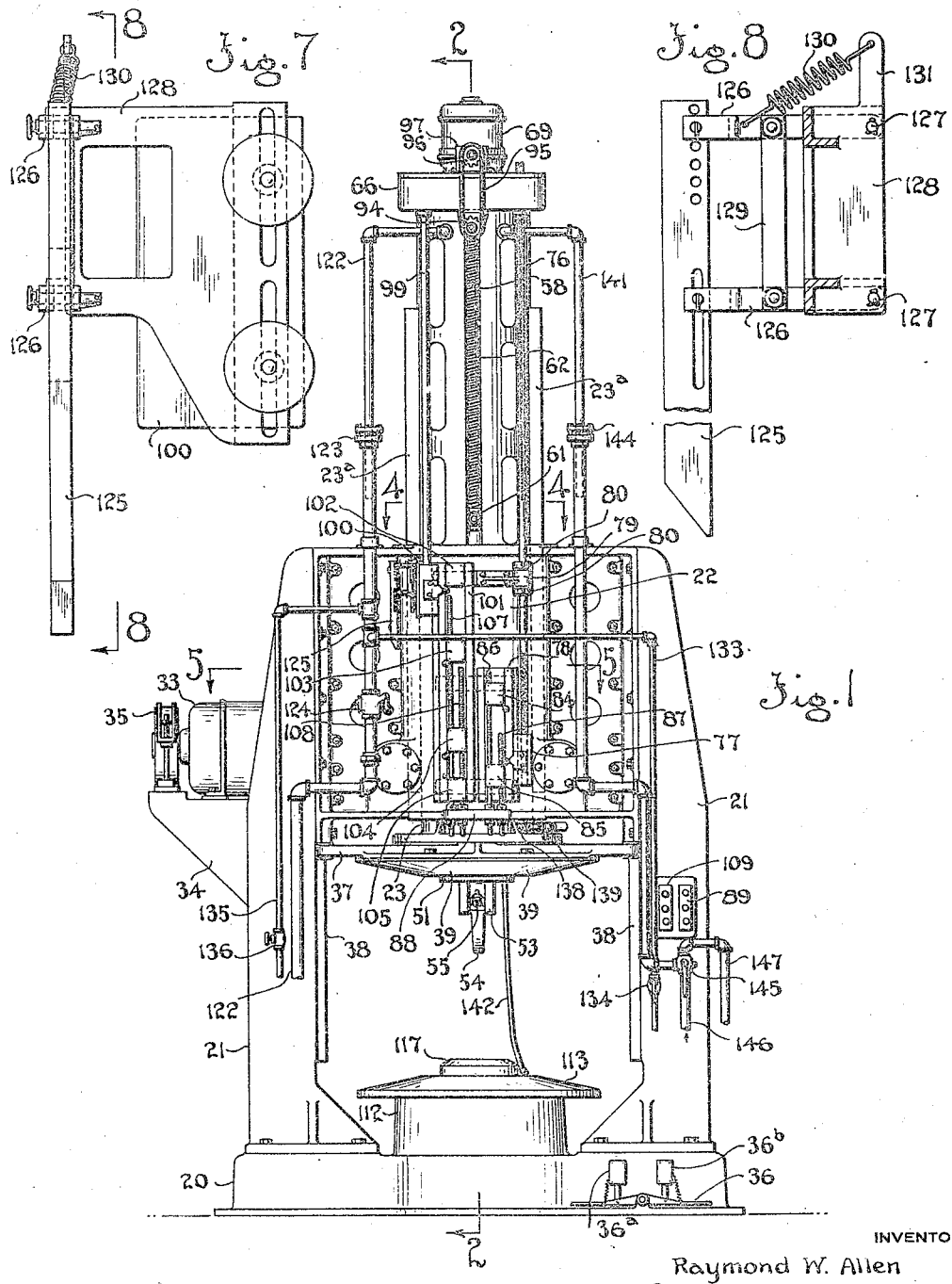

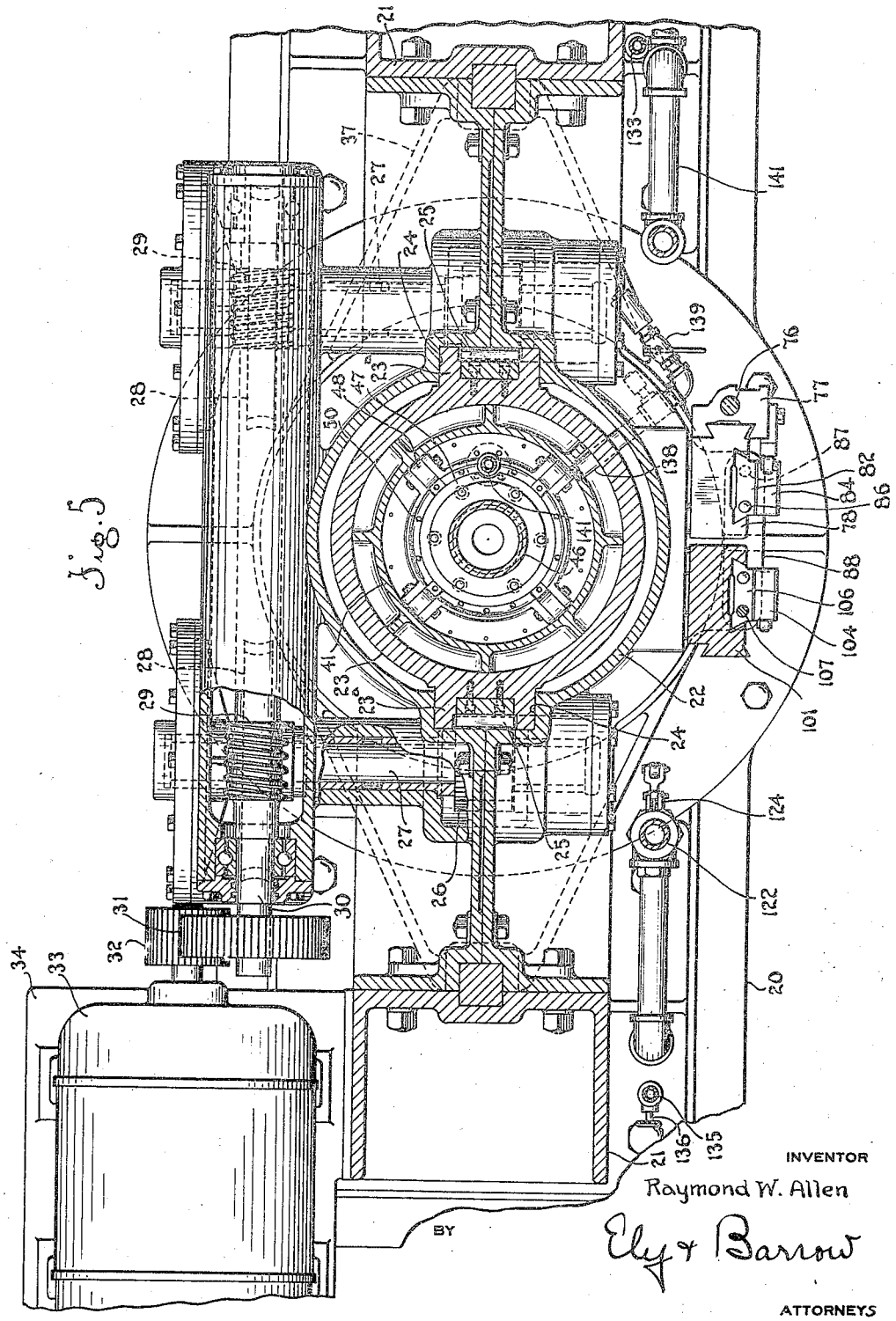

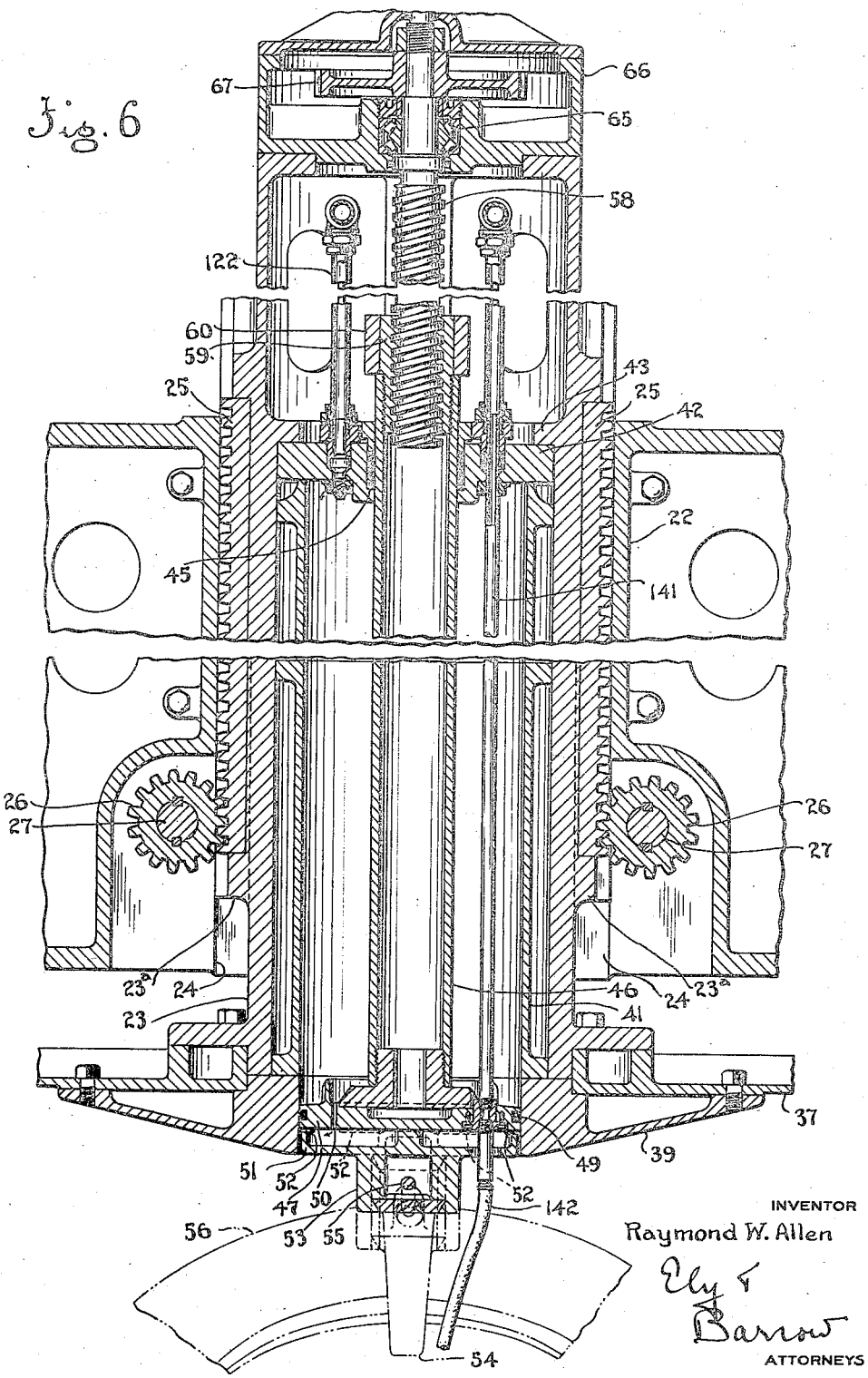

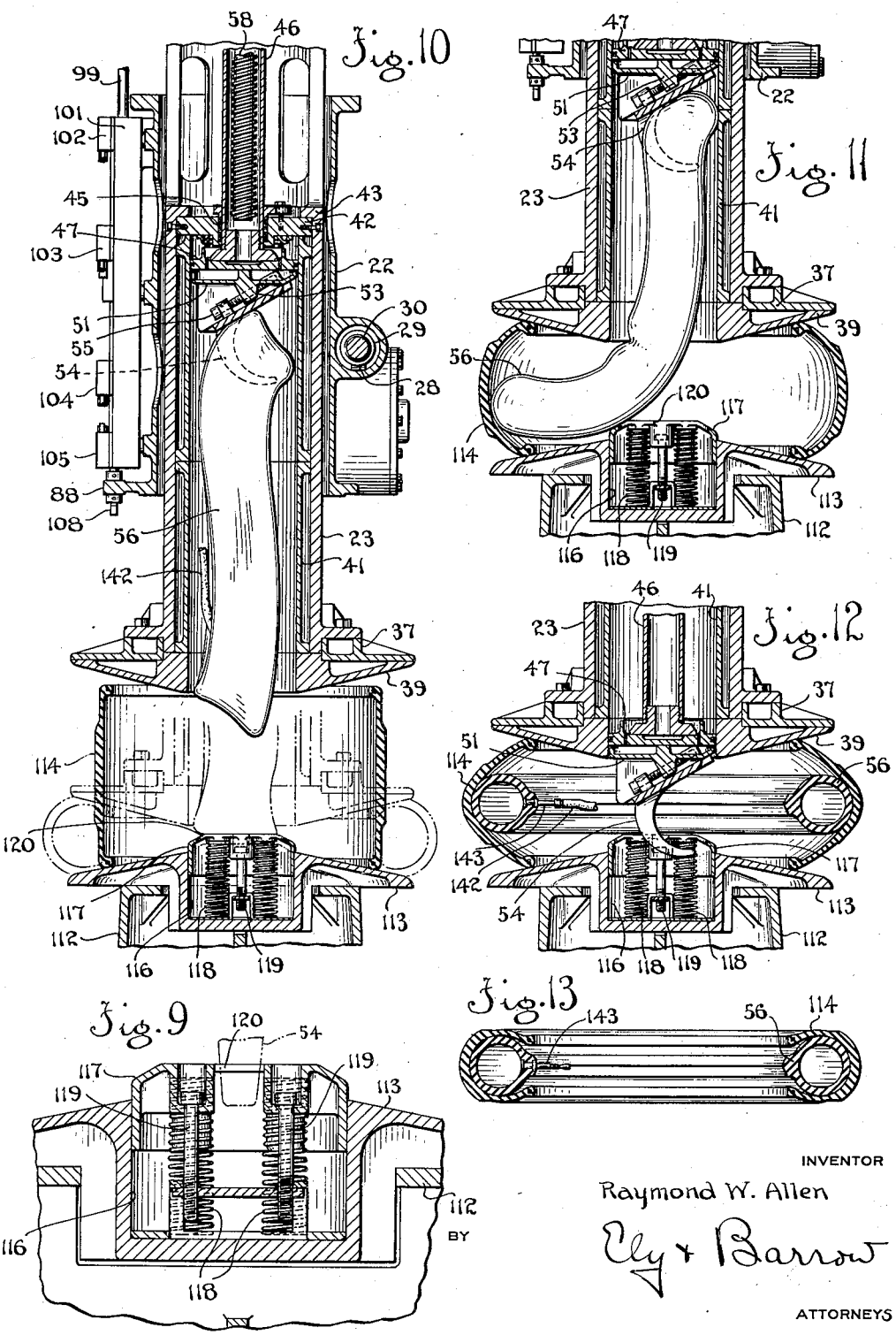

Patented June 25, 1935

2,006,307

UNITED STATES PATENT OFFICE 2,006,307

TIRE BUILDING APPARATUS

Raymond W. Allen, Akron, Ohio, assignor to The Firestone Tire & Rubber Company, Akron, Ohio, a corporation of Ohio Application December 5, 1933, Serial No. 700,947

13 Claims. (Cl. 18—2)

This invention relates to tire building apparatus, and more especially it relates to apparatus for shaping pulley band or drum built tire casings to tire form, and for concurrently inserting flexible expansible cores therein.

The invention is an improvement in that type of apparatus mentioned wherein the flat tire band is shaped to tire form by means of superatmospheric pressure applied to the inner surface of the band, and the expansible core, in elongate, collapsed form, is fed into the tire end first.

The chief objects of the invention are to conserve floor space; to facilitate the shaping of tires of relatively large size; and to reduce the manual labor required. Other objects will be manifest.

Of the accompanying drawings:

Figure 1 is a front elevation of apparatus embodying the invention, in its preferred form;

Figure 2 is a vertical section thereof on a larger scale, on the line 2—2 of Figure 1;

Figure 3 is a section on a larger scale on the line 3—3 of Figure 2;

Figure 4 is a section on a larger scale on the line 4—4 of Figure 1;

Figure 5 is a section on a larger scale on the line 5—5 of Figure 1;

Figure 6 is a section on a larger scale on the line 6—6 of Figure 2;

Figure 7 is a detail elevation, on a larger scale, of a cam that operates a valve in a fluid pressure line;

Figure 8 is a section on the line 8—8 of Figure 7;

Figure 9 is a section on the line 9—9 of Figure 2;

Figure 10 is a detail sectional view of a portion of the apparatus shown in Figure 2, as it appears in the initial phase of operation, and the work therein;

Figure 11 is a view similar to Figure 10 showing the apparatus at a subsequent phase of operation;

Figure 12 is a view similar to Figure 10 showing the apparatus as it appears in the final phase of operation; and Figure 13 is a diametric sectional view of a shaped pneumatic tire casing, and an expansible core therein.

Referring to the drawings, 20 is a base plate, and rising from opposite sides thereof are supporting columns 21, 21 that carry, at their upper ends, a generally cylindrical, vertically arranged housing 22. Concentrically disposed interiorly of the housing 22, and spaced from the wall thereof, is an outer cylinder 23 that is formed with diametrically opposed, longitudinal flanges 23a, 23a that are slidingly mounted in complemental slideways 24, 24 formed in the housing 22. The cylinder 23 is vertically movable relatively of the said housing, and to this end each flange 23a has a rack 25 mounted therein, which racks mesh with respective pinions 26 mounted upon one end of respective shafts 27 that are journaled in the housing 22, transversely of the axis thereof.

The shafts 27 extend rearwardly, and at their rear ends are provided with respective worm gears 28 that mesh with respective worms 29 that are mounted upon a common shaft 30, the latter being journaled in the housing 22, at right angles to shafts 27. At one end the worm shaft 30 is provided with a gear 31 that is meshed with a driving gear 32 mounted upon the shaft of a two-speed motor 33, the latter being supported upon a shelf or bracket 34 carried by one of the columns 21. The motor 33 is provided with a magnetic brake 35, Figure 1, by means of which it may be quickly stopped. A foot control 36 is provided for motor 33, said control comprising a switch 36a for causing the motor to rotate in the direction to lower the cylinder 23 and a switch 36b for causing the motor to lift the cylinder 23.

To give rigidity to the outer cylinder 23, especially in its lowered position, the lower end thereof is provided with a cross head 37 that is formed with laterally extending arms that engage respective vertical guide rails 38, 38 mounted on the inner faces of the respective columns 21. Secured to the bottom face of the cross head 37 is an axially apertured, frusto-conical, upper head 39 that tapers downwardly toward its axis, said head being adapted to engage one edge of a drum built tire band as subsequently will be explained.

Concentrically disposed interiorly of the outer cylinder 23, and spaced from the wall of the latter, is an inner cylinder 41, the lower end of which rests upon the upper head 39, the upper end of said inner cylinder being closed by a cylinder head 42 that bears against an annular flange 43 formed on the inner periphery of outer cylinder 23 about midway between its respective ends. The inner periphery of the inner cylinder 41 is flush with the aperture in the upper head 39.

Extending through an axial stuffing box 45 in the cylinder head 42 is a tubular plunger 46 upon the lower end of which is mounted a plunger head 47, the latter being provided on its upper face with four guide rollers 48, 48, Figure 5, that engage the inner surface of cylinder 41. The periphery of the plunger head is provided with a gasket 49 making sealed engagement with the cylinder 41, and an annular series of apertures 50, 50 extend through the plunger head and thus provide vents from the interior of said cylinder. The lower ends of apertures 50 open into the interior of a hollow spray plate 51 that is secured to the bottom of the plunger head 47. The perimeter of said spray plate is of somewhat smaller diameter than the inside of cylinder 41, and its peripheral wall is slotted at a plurality of points 52, 52, Figure 6, the arrangement being such that fluid from the interior of cylinder 41 may be projected through the slots 52 for a purpose presently to be explained.

The spray plate 51 is formed with a downwardly projecting lug 53 formed with a downwardly sloped, diametric, dovetail slideway in which is mounted the complementally shaped shank of a hook 54, a suitable adjusting screw 55 being provided for adjusting the hook longitudinally of said slideway. Preferably the hook opens toward the rear of the apparatus, as shown, the arrangement being such that an annular, flexible, expansible core 56 may be engaged by said hook and drawn up into the inner cylinder 41 when the plunger head 47 is moved upwardly. The adjustable feature of the hook 54 makes it adaptable for engaging expansible cores of various sizes.

For reciprocating the plunger head 47 there is provided a screw 58 that is threaded through a nut 59 that is fixed in the upper end of the tubular plunger 46. Keyed to the nut 59 is a yoke 60 having a pair of arms that extend forwardly and rearwardly respectively, the free end of each of said arms being provided with three rollers, one of which designated 61 engages in a vertical slot 62 formed in the upper end portion of the outer cylinder 23, and the other rollers 63, 63 engaging respective flanges formed interiorly of said cylinder at each side of said slot, as is most clearly shown in Figure 4. The arrangement prevents turning of the nut 59 and gives rigidity to the upper end of the plunger 46. The screw 58 is journaled near its upper end in suitable bearings 65 carried by a gear housing 66 that is mounted upon the upper end of outer cylinder 23. The upper end portion of screw 58 carries a gear 67 that is meshed with a pinion 68 on the shaft of a motor 69 that is mounted upon a vertical axis, atop the housing 66.

The gear housing 66 overhangs the cylinder 23 at the front thereof, and in said overhanging portion of said housing is journaled a short vertical shaft 71, Figure 2, that carries, within the housing, a pair of gears 72, and 73 of which the larger gear 72 is meshed with the pinion 68 on the motor shaft. The smaller gear 73 meshes with an idler gear 74, and the latter is meshed with a gear 75 that is feathered on a shaft 76. The latter extends freely through suitable bushings mounted in the upper and lower walls of the housing 66, and extends downwardly therefrom exteriorly of the cylinder 23, and has its lower end threaded into a cam block 77 that is slidably mounted for vertical movement upon a switch plate 78 mounted upon the front of the housing 22. At an intermediate point the shaft 76 extends through a bracket 79 that is mounted upon housing 22, and collars 80, 80 on the shaft at each side of said bracket prevent longitudinal movement of said shaft. The arrangement is such that the gear housing 66 and cylinder 23 may move relatively of the shaft 76, and the latter is driven at such speed with relation to the rotation of screw 58 that the cam block 77 is movable a relatively short distance as compared to the movement of plunger head 47.

The switch plate 78 is formed with a dovetail slideway for a pair of slides, such as the slide 82, upon which are mounted respective upper and lower limit switches 84, 85 for stopping the drive of motor 69 at determinate points in the travel of the plunger head 47, said switches having their operating levers positioned in the path of movement of the cam block 77 so as to be operated by the latter. Respective adjusting screws 86, 87 are provided for adjusting the relative positions of the slides 82, 83, said screws being supported by a flange 88 projecting forwardly from the housing 22. The motor 69 is manually controlled by a switch 89 on one of the columns 21.

The shaft 71, Figure 1 extends through the bottom of gear housing 66, exteriorly of cylinder 23, and on its lower end carries a bevel gear 91 that is meshed with a bevel gear 92 on one end of a short shaft 93, the other end of shaft 93 carrying a sprocket 94 connected by sprocket chain 95 with sprocket 96 on the shaft of a centrifugal governor switch 97. The function of switch 97 is to prevent excessive speed of motor 69.

Connected to the bottom of gear housing 66 and extending downwardly therefrom, at the front of the machine, is a tie rod 99 to the lower end of which is attached a cam block 100 that is slidably mounted for vertical movement upon a switch plate 101 mounted upon the front of housing 22, beside switch plate 78. Mounted upon the latter are four switches 102, 103, 104 and 105 respectively, which switches control the two-speed motor 33, the operating levers of said switches extending into the path of cam block 100. All of said switches are mounted upon slides, such as the slides 106, on the switch plate 101, the slides for the uppermost and lowermost switches 102 and 105 respectively being in fixed position on the switch plate. The intermediate switches 103 and 104 respectively are adjustable relatively of each other and of the upper and lower switches by means of respective adjusting screws 107, 108, which screws are mounted in the flange 88.

The uppermost switch 102 is a limit switch that stops the motor 33 and applies the brake 35 thereto when the cylinder 23 reaches the uppermost limit of its travel. The switch 103 cuts out the high speed of the motor 33 and reduces it to low speed during the downward travel of the cylinder 23. The switch 104 cuts out the low speed of the motor 33 during the downward travel of the said cylinder. And switch 105 is a limit switch that applies the brake 35 to the motor if the cylinder coasts too far after the motor is cut off by switch 104. The motor 33 is manually controlled by a switch 109 beside switch 89 on the column 21.

Fixedly mounted upon an annular flange 112 rising from the base plate 20 is a frusto-conical, lower head 113 that is in axial alignment with upper head 39 and reversely tapered with relation to the latter. The lower head 113 is adapted to support a drum built tire band, such as is shown at 114, by one margin thereof in position to have its other margin engaged by the upper head 39 during the operation of the apparatus. Thus the said upper and lower heads seal the interior of the tire band so that it will retain pressure fluid of sufficient pressure to bow the tire band centrally to tire shape, thereby permitting the expansible core 56 to be inserted into the tire.

The lower head 113 is formed with an upwardly opening, axial recess 116 of substantial size, and yieldingly mounted in said recess is deflector member 117 that is of inverted cup-shape form. Said deflector is backed by a pair of compression springs 118, 118, and its upward movement is limited by a pair of bolts 119, the normal position of the top of said deflector being somewhat above the top of lower head 113. The deflector 117 is formed with a central slot 120 that is aligned with the hook 54 and receives the latter when the plunger head 47 is in its lowermost position, as shown in Figure 12.

Fluid pressure to expand the tire band 114 to tire shape is admitted thereto through the spray ring 51, from the inner cylinder 41, and it is admitted to said cylinder through a pipe 122 that opens into said cylinder through the cylinder head 42. The pipe 122 extends through the outer cylinder 23 near the top thereof, and extends downwardly, exteriorly of said cylinder, through a slip-joint 123, to any suitable source of supply (not shown). Exteriorly of the machine there is a valve 124 in the pipe 122, the operating lever of said valve extending into the path of a cam 125 carried by the cam block 100. As is best shown in Figures 7 and 8, the cam 125 is a vertical metal strip that is tapered at its lower end, and pivotally mounted upon the free ends of a pair of parallel arms 126, 126 that are pivotally mounted at 127, 127 upon a bracket 128 that is vertically adjustable upon the cam block 100. A link 129 connects the arms 126 at an intermediate point. The bracket 128 is so constructed that the free ends of arms 126 may move downwardly but not upwardly from a normal horizontal position, and a tension spring 130 connecting the upper arm 126 to an extension 131 of bracket 128 normally supports said arms in horizontal position.

The arrangement is such that cam 125 may be adjusted relatively of valve 124 so as to engage the latter at a determinate time during the downward movement of cylinder 23, which time is after the upper head 39 engages the upper bead of tire band 114, with the result that fluid pressure automatically is admitted to the interior of the tire band to shape the same. Downward movement of cylinder 23 carries the cam 125 past valve 124 allowing the latter to close and thus shutting off the fluid pressure to the tire. In the subsequent rising movement of the cylinder 23 the cam is moved past the valve by reason of the tilting of the arms 126 against the tension of spring 130.

If desired, the distension of the tire 114 may be controlled manually by means of a pipe 133 connected to the same source of fluid pressure as the pipe 122, said pipe 133 being connected to pipe 122 above valve 124 and being provided with a manually operated whistle valve 134 disposed conveniently for use by the operator. If desired, a lubricant such as soapstone dust may be applied to the interior surface of the tire 114 by means of a pipe 135 from a suitable source of lubricant (not shown), there being a manually operated valve 136 in said pipe 135.

For evacuating fluid pressure from the tire 114 after it is shaped to tire form and the expansible core 56 mounted therein, there is provided a short vent pipe 138 that communicates with the interior of inner cylinder 41, and projects therefrom below the housing 22, as is most clearly shown in Figures 1 and 5, said vent pipe being provided with a manually operated whistle valve 139.

Collapsing of the expansible core 56 is facilitated by the withdrawal of air therefrom, and its insertion into the shaped tire 114 is facilitated by inflation of the core. To this end a pipe 141 extends through the upper cylinder head 42 of cylinder 41, and through plunger head 47 and spray plate 51, said pipe having a flexible hose 142 connected to its lower end for attachment to the inflating stem 143 of the expansible core 56. The pipe 141 extends upwardly from the cylinder head 42 and extends outwardly through the cylinder 23 near the top thereof. Exteriorly of said cylinder the pipe 141 extends downwardly through a slip joint 144 to a four-way, manually operated valve 145 that has connection through a pipe 146 with a source of supply (not shown) of inert gas, such as carbon dioxide ($CO_2$) gas. The valve 145 also has connection through pipe 147 with a source of suction whereby subatmospheric pressure may be established in the core 56.

In the operation of the apparatus, the respective parts thereof being in the positions shown in Figures 1 and 2, an expansible core 56 is suspended from hook 54 and the flexible hose 142 is connected to the inflating stem 143 of said core, said inflating stem preferably being disposed at the lower side of the core. The operator then turns valve 145 to apply suction to the interior of core 56 causing the latter somewhat to collapse, after which he presses the proper button of switch 89 to set the motor 69 in motion to rotate the screw 58 and thereby to lift the plunger head 47 and with it the hook 54. The rising hook carries with it the core 56, the latter thereby being folded and elongated, and pulled up into the interior of the inner cylinder 41, as is most clearly shown in Figure 10 and in broken lines in Figure 2. During this operation the operator pulls the lower end of core 56 forwardly so that the core assumes a determinate position in the cylinder 41 so that upon subsequent ejection from said cylinder it will emerge therefrom in a non-axial direction. The motor 69 stops running when cam block 77 engages and operates limit switch 84.

The operator then mounts a tire band 114 upon lower head 113, and next operates foot control 36 to close switch 36a to set motor 33 in motion to lower outer cylinder 23 and upper head 39. The initial motion of motor 33 is at high speed, but is reduced to low speed when the cam block 100 engages and operates switch 103, this occurring substantially at the time the upper head 39 engages the upper bead of the tire band. At about the same time the cam 125 engages and opens valve 124 in the pressure fluid line 122, thus delivering air at superatmospheric pressure to the interior of the tire 114 to bow the middle thereof as the descending head 39 moves the upper bead of the tire toward the lower bead thereof. Lubricant may be applied to the interior of the tire as it is thus formed by opening valve 136 in pipe line 135.

As the head 39 continues to descend, the cam block operates switch 104 to cut off current to the motor 33, the head coasting a trifle thereafter. If it coasts too far, the cam block will operate limit switch 105 to apply brake 35 to the motor. The head 39 and tire 114 are now in the positions shown in broken lines in Figure 10. If the core 56 extends beyond the bottom of the head 39 it may depress the deflector 117 against the pressure of springs 118.

The operator then reverses the motor 33, by means of switch 109, to raise the upper head 39 substantially to the position shown in Figure 11, the pressure within the tire keeping its bead portions sealed against the heads 39, 113. Next the proper button of switch 89 is operated to set the motor 69 in motion to operate screw 58 to lower plunger head 47 and hook 54. The operator also turns valve 145 to release the suction in the core 56 and concurrently to inflate the same with inert gas. As the core 56 is fed downwardly by the lowering plunger head 47, the leading end of said core is deflected laterally by deflector 117 so that it moves toward the inner periphery of the tire 114. The concurrent inflation of core 56 causes it progressively to assume its normal circular form and thus progressively to fill the tire. At its lowermost position the hook 54 is positioned in slot 120 of deflector 117, thus assuring that the core will be completely disengaged from the hook, as is most clearly shown in Figure 12. Downward movement of the hook ceases when cam block 77 engages and operates switch 85 to stop motor 69.

The valve 145 is then turned to neutral position to relieve the pressure in core 56, and the valve 139 manually operated to exhaust the pressure fluid from tire 114. Foot control 36 may then be operated to drive the motor 33 to lift the cylinder 23 and upper head 39 to the normal inoperative position shown in Figure 1, the motor stopping when cam block 100 engages and operates limit switch 102. The tire 114 and core 56, assembled as shown in Figure 13, may be removed from the apparatus as soon as the hose 142 is disconnected from the inflating stem 143 of said core. This completes one cycle of operation, which may be repeated as desired.

The apparatus is especially advantageous in the shaping of tires of relatively large size in that little lifting of the tire and core is required, and labor is conserved.

Modification may be resorted to without departing from the spirit of the invention or the scope of the appended claims.

What is claimed is:

1. In apparatus of the character described, the combination of a stationary head adapted to engage one marginal portion of a flat band tire, an opposed, movable apertured head adapted to engage the opposite margin of said tire, and means for feeding an expansible core in collapsed, elongate condition, end first through the aperture in said movable head into the interior of the tire between said heads.

2. In apparatus of the character described, the combination of a stationary lower head for supporting a flat band tire by one margin thereof, an opposed, axially apertured upper head movable toward and away from the lower head so as to engage the other margin of said tire, and means for pulling an expansible core through said upper head to collapse and elongate the core, and subsequently to force said core backward through said head into the tire.

3. In apparatus of the character described, the combination of a fixed head and a movable head adapted to cooperate in giving tire shape to a tire made in flat band form, a holder disposed exteriorly of the movable head for receiving a circular expansible core, said holder being of a width less than the bead diameter of the tire so as to impart to said core an elongate shape, and said holder communicating with a pressure chamber defined between the opposed heads and within the tire, means for drawing the core into the holder to elongate it and subsequently to expel it therefrom into the shaped tire, and means for supplying pressure fluid to said pressure chamber to assist the heads in shaping the tire.

4. In apparatus of the character described, the combination of a pair of relatively movable, opposed heads adapted to engage a flat band tire at the respective margins thereof, one of said heads having an opening therethrough, means for feeding an expansible core in collapsed elongate condition end first through said opening into the interior of said tire, and a yieldingly mounted deflector positioned at the axis of the other head.

5. In apparatus of the character described, the combination of a pair of relatively movable, opposed heads adapted to engage a flat band tire at the respective beads thereof, a coaxial hollow holder associated with one of said heads, a hook movable into and out of said holder for engaging a collapsible core to draw it into said holder in collapsed condition and subsequently to expel it therefrom into said tire, and a deflector positioned at the axis of the other head and formed with a slot to receive said hook in the outermost position of the latter.

6. In apparatus of the character described, the combination of a fixed head adapted to support a flat band tire by one margin thereof, an opposed movable head adapted to engage the other margin of the tire, a holder associated with said movable head and communicating at one end with a chamber defined by said heads and an interposed tire, a hook movable longitudinally into and out of said holder for drawing an expansible core in collapsed condition into holder and for subsequently ejecting it therefrom, and a deflector axially disposed in the stationary head adapted to engage and laterally deflect said core as it is being ejected from said holder.

7. A combination as defined in claim 6 including a yielding support for said deflector.

8. A combination as defined in claim 6 in which the deflector is slotted to receive the hook in the lowermost position of the latter.

9. In apparatus of the character described, the combination of a stationary head adapted to support a flat band tire by the lower margin thereof, a housing positioned above said head, a hollow cylinder slidably mounted in said housing, an axially apertured head on the lower end of said cylinder adapted to engage the upper margin of said tire, a hook movable longitudinally within said cylinder for drawing an expansible core, in collapsed condition into said cylinder and for subsequently ejecting it therefrom through the head on said cylinder, and means for moving said cylinder relatively of said housing to cause it to engage said tire.

10. In apparatus of the character described, the combination of a stationary lower head adapted to support a flat band tire by one margin thereof, a housing positioned above said head, a hollow cylinder disposed in axial alignment with said lower head slidably mounted in said housing, an annular upper head on the lower end of said cylinder, means for axially moving said cylinder to cause the head thereon to engage the upper margin of a tire positioned on said lower head, a plunger within said cylinder, a hook on the bottom of said plunger adapted to engage an expansible core, means for moving the plunger longitudinally of said cylinder to draw said core thereinto and subsequently to eject it therefrom, means passing through said plunger and connected to the said core to evacuate or inflate the same, and means for passing pressure fluid through said plunger to establish superatmospheric pressure on the inner surface of the tire when engaged by both of said heads.

11. A combination as defined in claim 1 including means for actuating said movable head comprising a pair of opposed rack and pinion members at the sides of said head, a pair of worm gears for rotating said pinions, and a pair of worms operatively engaging said worm gears, said worms being formed on the same shaft and being right and left hand to provide an interlocking arrangement of said gears to prevent movement of the head except by rotation of said worms.

12. A combination as defined in claim 1 including a high and low speed mechanism for moving said movable head whereby said head may be moved at high speed until it comes into engagement with the tire and may then proceed at low speed during the forming of the tire.

13. A combination as defined in claim 1 including a high and low speed mechanism for moving said movable head in a direction toward said tire whereby said head may be moved at high speed until it comes into engagement with the tire and may then proceed at low speed during the forming of the tire, and mechanism for moving said head in a direction away from said tire at high and low speeds.

RAYMOND W. ALLEN.